United States Patent [19]

Huber et al.

[11] 3,932,098

[45] Jan. 13, 1976

[54] CASE ASSEMBLY WITH TUNGSTEN CARBIDE INSERTS FOR CERAMIC TILE DIE

[75] Inventors: William W. Huber, North Canton; Rollin R. Shriner, Massillon; Harry N. Shuman, East Sparta, all of Ohio

[73] Assignee: Spartek Inc., Canton, Ohio

[22] Filed: Dec. 18, 1974

[21] Appl. No.: 534,138

[52] U.S. Cl. ................. 425/412; 425/415; 425/422

[51] Int. Cl.[2].. B28B 3/02; B29C 3/00; B29B 11/00; B28B 7/00

[58] Field of Search ............ 425/406, 412, 415, 422

[56] References Cited

UNITED STATES PATENTS

| | | | |
|---|---|---|---|
| 2,026,940 | 1/1936 | Hendryx | 425/412 X |
| 3,200,465 | 8/1965 | Lassman | 425/415 |
| 3,447,205 | 6/1969 | Dorsey | 425/415 X |
| 3,523,344 | 8/1970 | Huber et al. | 425/422 X |
| 3,587,144 | 6/1971 | Mechling | 425/422 |
| 3,632,276 | 1/1972 | Munk | 425/415 |
| 3,720,491 | 3/1973 | Dedek | 425/412 X |

*Primary Examiner*—J. Howard Flint, Jr.
*Attorney, Agent, or Firm*—Gardiner, Sixbey, Bradford & Carlson

[57] ABSTRACT

The case assembly for a ceramic tile die includes a die cavity assembly formed by an insert support member and a plurality of inserts mounted on the upper surfaces of the insert support member. The inserts are preferably formed of tungsten carbide and may be universally mounted on the insert support member to provide a plurality of usable wear surfaces. A rigid frame surrounds the die cavity assembly, and mounting means are provided to permit limited, pressure induced movement between the die cavity assembly and the rigid frame. This minimizes the tensile stress to which the walls of the die cavity assembly are subjected.

20 Claims, 5 Drawing Figures

CASE ASSEMBLY WITH TUNGSTEN CARBIDE INSERTS FOR CERAMIC TILE DIE

BACKGROUND OF THE INVENTION

The requirements which must be built into a ceramic tile die for forming granular ceramic material into dry pressed tile blanks for ceramic floor and wall tile will be better understood by being aware of the conditions to which such a die is subjected in forming ceramic tile and the type of presses used. All ceramic tile dies in general consist of a case of female member having one or more through openings which form the outer dimensions of the tile to be shaped, a lower punch or male member entering from the bottom of the case and operating vertically with respect to the case, and an upper punch or male member entering the top of the case to compress the ceramic material. Regardless of the press used, the action of the die members must be the same to produce structurally sound tile, free of laminations, or so-called "air blows".

Laminations in ceramic dry-pressed tile are fully explained in U.S. Pat. No. 3,671,618 Huber et al., which clearly defines the die and press action necessary to produce structurally sound tile.

Of three types of presses used in the tile industry, the friction type is the most common; but also, the most abusive for the tile dies. A horizontal fly wheel is mounted on a vertical worm screw threaded through the press crown, with a ram bearing upper punches being attached to the lower end of the worm by a ball joint. Two friction discs driven by a horizontal shaft, one on each side of the fly wheel act to change the fly wheel direction. The case is mounted to rods extending through the stationary press bed and is actuated by an air cylinder from below, and lower punches are secured to the press bed. As a friction disc contacts the fly wheel, the worm drives the ram containing the upper punches downwardly. Just before the punches enter the case, the friction disc is disengaged, and the inertia of the fly wheel drives the upper punches downwardly until the pressure of the punches on the compacted material is sufficient to absorb the energy. As the fly wheel comes to rest, the expansion of the compacted material causes the fly wheel to reverse its rotation. A play in the ball joint allows the worm screw to reverse without lifting the ram, thus allowing the weight of the ram and upper punches to remain on the compacted tile with enough pressure to allow the release of internal stresses, but not permitting the displacement of fractured parts. The air in the cylinder supporting the case permits the case to recede under the pressure stroke as stops on the upper ram come into contact with the case to position the punches at the correct depth in the case. However, there is not enough air pressure to lift the weight of the ram and upper punches, and thus the compressed tile remains sandwiched between the upper and lower punches. Just before the reversed worm screw moves sufficiently to take up the amount of play in the ball joint, a second downward clutching is made reversing the fly wheel rotation for a second impact stroke. As this stroke is completed, the fly wheel is clutched for the return of the ram to rest position.

The above described press cycle imparts a hammer-like blow to the material within the die. When considered these blows represent an impact of around 125 tons or 2,000 PSI on the compact material.

The toggle acting press is probably the fastest acting press of the three types of presses. While its strokes are more of a squeeze than an impact, the increased speed accounts for severe shock to the ceramic tile die. The operation of the toggle acting press is fully described in U.S. Pat. No. 3,523,344 to Huber et al.

Some hydraulic presses are used in the industry, but due to their slower action they are used mostly where high pressures are required, such as around 3,000 PSI. Their action is relatively the same as the friction and toggle presses, but completely controlled by the slower hydraulic action.

Conventionally, ceramic tile die assemblies have been provided with a multiple cavity case constructed of an outer frame with cross members interlocked to this outer frame forming openings equal to the outer dimension of the tile to be formed. With cases having tandum rows, other members extend across the case at right angles to the first cross members and are interlocked thereto. General practice has been to make the parts from hardened and tempered alloy steels to provide the wearing surfaces of the cavity. The alloy steel held up well agains the shock and abuse, but the abrasive ceramic material resulted in a short wear life. Also, the machining, grinding and fitting of these members with the accuracy required to assure that each opening is dimensionally the same is expensive, resulting in high tooling costs.

Methods have been developed to avoid replacing these expensive members when worn by facing the wear portion of the cavity with less expensive removable inserts and replacing them when worn. Many problems arise in attempting to secure these inserts, especially on the cross members, without increasing the width of said members and thereby reducing the number of openings permissable within the die area. Also, problems occur if the means of attaching the insert requires a screw having a head on the wearing side of the insert or that portion within the operating range of the lower punch. With this attachment method, there exists the danger of the screw backing out and binding the action of the lower punch. Additionally, the opening created by the screw head invites the buildup of ceramic material which will pack causing the binding of the lower punch as well as causing undue wear on the face of the insert due to the grinding action of the ceramic material as the lower punch is actuated to eject the pressed tile. Once an alloy steel insert becomes worn, it must be discarded.

Ideally, a material such as cemented tungsten carbide, having a wear resistance many times that of handened alloy steels, should be used in the manufacture of ceramic tile dies. However, the costs of machining the same eliminate the use of this material for the tile die. Tungsten carbide could be employed for tile die inserts, but unfortunately a character of tungsten carbide is that as the hardness and wear resistance is increased, the brittleness increases and shock resistance is lowered. Under the conditions present in a conventional ceramic tile die, tungsten carbide inserts chip or fracture immediately and become worthless.

Tungsten carbide inserts have previously been found to be practically impossible to operatively attach to a case assembly. Braising or silver soldering a tungsten carbide insert to the case members, especially in the lengths required, 4¼ × 4¼/ and 6 × 6 dies, is not successful due to the difference in expansion of the two metals when heated. Under heated conditions fracturing of the tungsten carbide occurs.

Screw connections for the tungsten carbide inserts present the same problems experienced with other screw connected inserts. In fact, it has been found that the rigid connection in any manner of tungsten carbide inserts to the case assembly results in the chipping or fracture of these inserts during a tile pressing cycle due to the high tensile stresses experienced by the inserts. These seemingly insurmountable problems have tended to discourage the use of cemented tungsten carbide as a material adapted for use in ceramic tile dies.

A primary object of the present invention is to provide a novel and improved case assembly for a ceramic tile die which is adapted to include tungsten carbide inserts to provide die cavity wear surfaces. This is accomplished by providing an insert support assembly which is permitted to move relative to a case assembly frame to relieve shock under extreme conditions which would normally damage the inserts.

Another object of the present invention is to provide a novel and improved case assembly for a ceramic tile die having a novel insert support assembly to support inserts so that at least two wear surfaces thereof may be effectively utilized. The individual inserts are provided with bottom attachments to the insert support assembly so that the side wear surfaces of the inserts are free for use as wear surfaces. This bottom attachment also permits the inserts to be used without increasing the thickness of the die cavity defining structure.

A further object of the present invention is to provide a novel insert structure for use in a ceramic tile die which is universally adapted to be positioned at any location in a die cavity defining assembly to provide a wear surface for the die cavity. This insert structure may be repositioned to provide a minimum of two usable wear surfaces for the die cavity, and all inserts for the ceramic tile die are the same size and shape.

A still further object of this invention is to provide a novel tungsten carbide insert structure for use in a ceramic tile die having a tapered entry edge conforming to the maximum misalignment angle of a tile press to minimize chipping of the insert.

These and other objects of the invention will become readily apparent upon a consideration of the following specification and claims taken in conjunction with the accompanying drawings in which:

Ceramic floor and wall tile are formed under pressure from granular ceramic material which is pressed within a case assembly that constitutes the female portion of a tile die. All ceramic tile dies normally include this case assembly which has one or more through openings to define the outer dimensions of the tile to be shaped. A lower punch or male member enters from the bottom of the case assembly and operates vertically between two positions, the lower position being represented by the depth of the fill required and the upper position being flush with the top of the case assembly to facilitate ejection of the formed piece. An upper punch or male member enters the top of the case assembly to compress the ceramic material therein.

Figure 1:
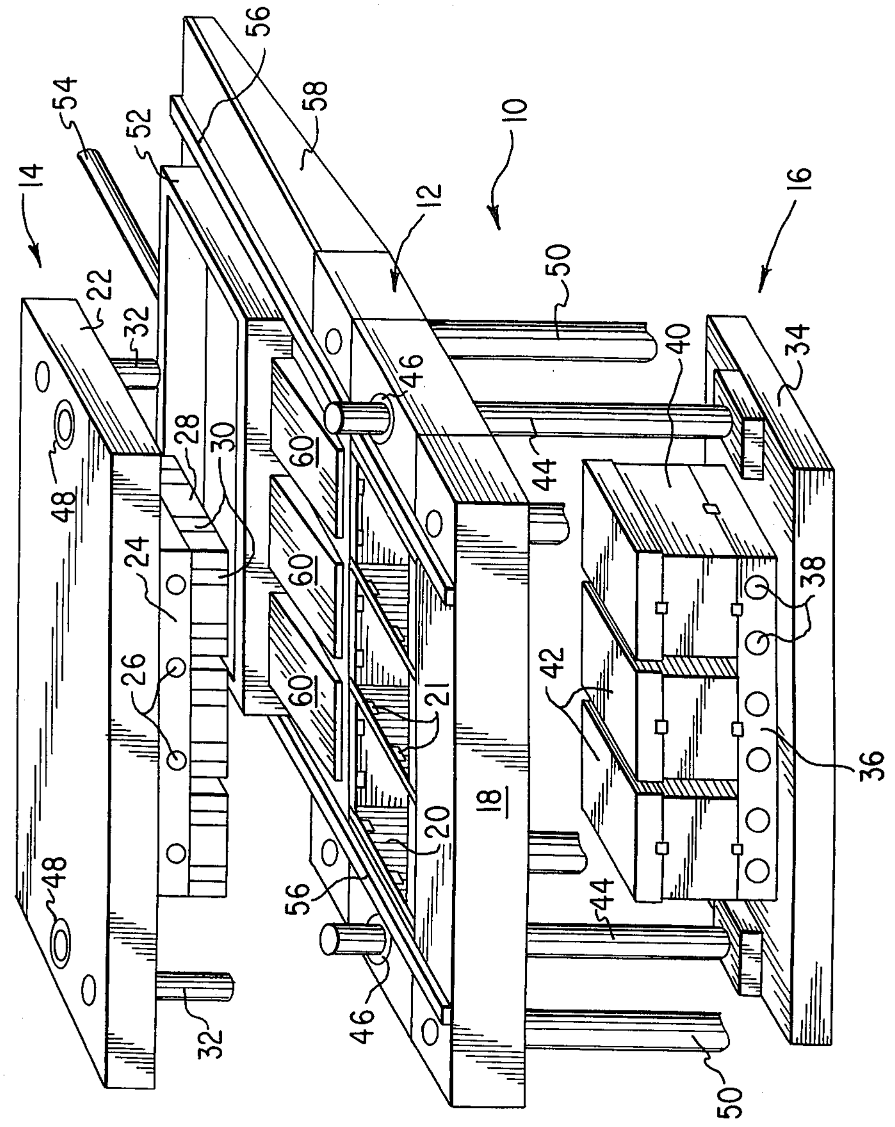
FIG. 1 is an isometric view of a typical ceramic tile die.

FIG. 1 illustrates a conventional ceramic tile die assembly indicated generally at 10 which consists essentially of three primary parts; namely a case assembly 12, an upper punch assembly 14, and a lower punch assembly 16. This case assembly is a multi-cavity assembly including an outer frame 18 having cross members locked thereto to provide a plurality of cavities. Each of these cavities is lined by cavity liners 20 which in actuality define the outer edge configuration of the tiles formed in the case assembly, and these cavity liners may include impressions 21 for forming spacer lugs on the outer edges of the tile.

The upper punch assembly 14 includes a base 22 which supports a heater plate 24 through which heating elements 26 are installed. Upper punches 28 are mounted upon the heater plate and are provided with peripheral male projections 30 which mate with the impressions 21. Downwardly projecting limit stops 32 engage the case assembly 12 to limit the entry of the upper punches into the die cavities. When the limit stops engage the case assembly, downward movement of both the upper punches and case assembly occurs until the upper punch has compressed the ceramic material against the lower punch sufficiently to absorb the flywheel energy, or, in the case of a toggle press, until peak pressure is reached and the lower hydraulic cushion recedes. The case assembly, when contacted by the limit stops, moves downwardly against the low air pressure in the case supporting cylinder.

The lower punch assembly 16 includes a base 34 upon which is mounted a heater plate 36 containing heating elements 38. Riser blocks 40 are mounted upon the heater plate 36 and support lower punches 42. Guide pins 44 secured to the base 34 extend through bushings 46 in the case assembly and bushings 48 in the base 22 for the upper punch assembly. These guide pins align the case assembly and the upper and lower punch assemblies. Also, four supporting rods 50 at the corners of the case assembly operate to actuate the case assembly.

A fill box 52 activated by a connection 54 is mounted between guide rails 56 which align the movement of the fill box across both an apron 58 and the case assembly 12. The forward end of the fill box is provided with punsh out fingers 60 to eject finished tile from the case assembly.

The operation of the ceramic tile die assembly 10 of FIG. 1 in conjunction with the structure of a conventional ceramic tile press to form ceramic tile is well known in the art and is described in a number of publications such as U.S. Pat. Nos. 3,523,344 and 3,671,618 previously mentioned. However, the operation of the ceramic tile die assembly of FIG. 1 will be briefly described to provide a basis for understanding the function of the novel case assembly with tungsten carbide inserts of the present invention. At the end of a pressing cycle, relative movement is initiated between the case assembly 12 and the lower punches 42 to cause the punches to raise pressed tile upwardly out of the cavities of the case assembly. At the same time, the upper punch assembly is raised upwardly to permit the fill box 52 to move forward along the guide rails 56 into position over the cavities in the case assembly. As the fill box 52 moves forward, the push out fingers 60 engage the finished ceramic tile and move these tiles clear of the upper surface of the face of the case assembly. Immediately, relatiae movement is again initiated between the case assembly and the lower punches so that the lower punches are dropped within the case assembly to a depth equal to the fill required. This occurs before the fill box 52 reaches a position over the cavities of the case assembly.

It will be noted from FIG. 1 that the fill box 52 consists of a box-type frame which is open at the top and bottom and which has dimensions slightly greater than the combined openings of the cavities in the case assembly. In the retracted position, the fill box is supported by the apron 58 which provides a bottom therefor and enables the fill box to receive ceramic material from a feed hopper. Thus, the forward movement of the fill box along the guide rails 56 ejects the finished tile from the case assembly and subsequently provides powered ceramic material to fill the cavities of the case assembly for the next pressing cycle.

Once the cavities of the case assembly are filled, the fill box returns to a position on the apron 58 to allow the upper punches 28 to enter and seal the openings in the cavities of the case assembly. As the upper punch assembly 14 moves downwardly, to press the ceramic material within the case assembly, the limit stops 32 engage the case assembly to limit the entry of the upper punches 28 into the cavities of the case assembly 12.

Of the three units constituting the ceramic tile die assembly 10, the case assembly receives the greatest wear. Normal operation of the ceramic tile press exposes the case assembly to pressure induced shock coupled with the abrasive action of ceramic material. Additionally, the ceramic material will sometimes become unevenly packed during the transfer of such material from the primary feed hopper to the fill box and then to the die cavity. This causes unequal filling of the various cavities within the case assembly, and the punches entering the die cavity are thereby thrown out of parallelism at the point of peak pressure. With the punches out of parallelis, undue side thrust against the sidewalls of the cavity occurs.

An additional distorted force can be applied to the case assembly if ceramic material builds up on the face of the punches. Should this ceramic material buildup go undetected, compressed parts may adhere to the upper punch while the fill box refills the cavity. When the upper punch again re-enters the cavity with the pressed tile adhered thereto, a press occurs with double the fill of the remaining cavities. This double press can cause havoc with the case assembly.

A novel case assembly of the present invention including a novel tungsten carbide insert structure is designed to replace the case assembly 12 of FIG. 1 to provide a structure better suited to withstand the abrasion and shock forces to which a ceramic tile die assembly is subjected. The high compressive and abrasion resistive characteristics of tungsten carbide inserts are employed in combination with a novel case assembly frame structure which operates to minimize the tensile stress applied to the inserts.

Figure 2:
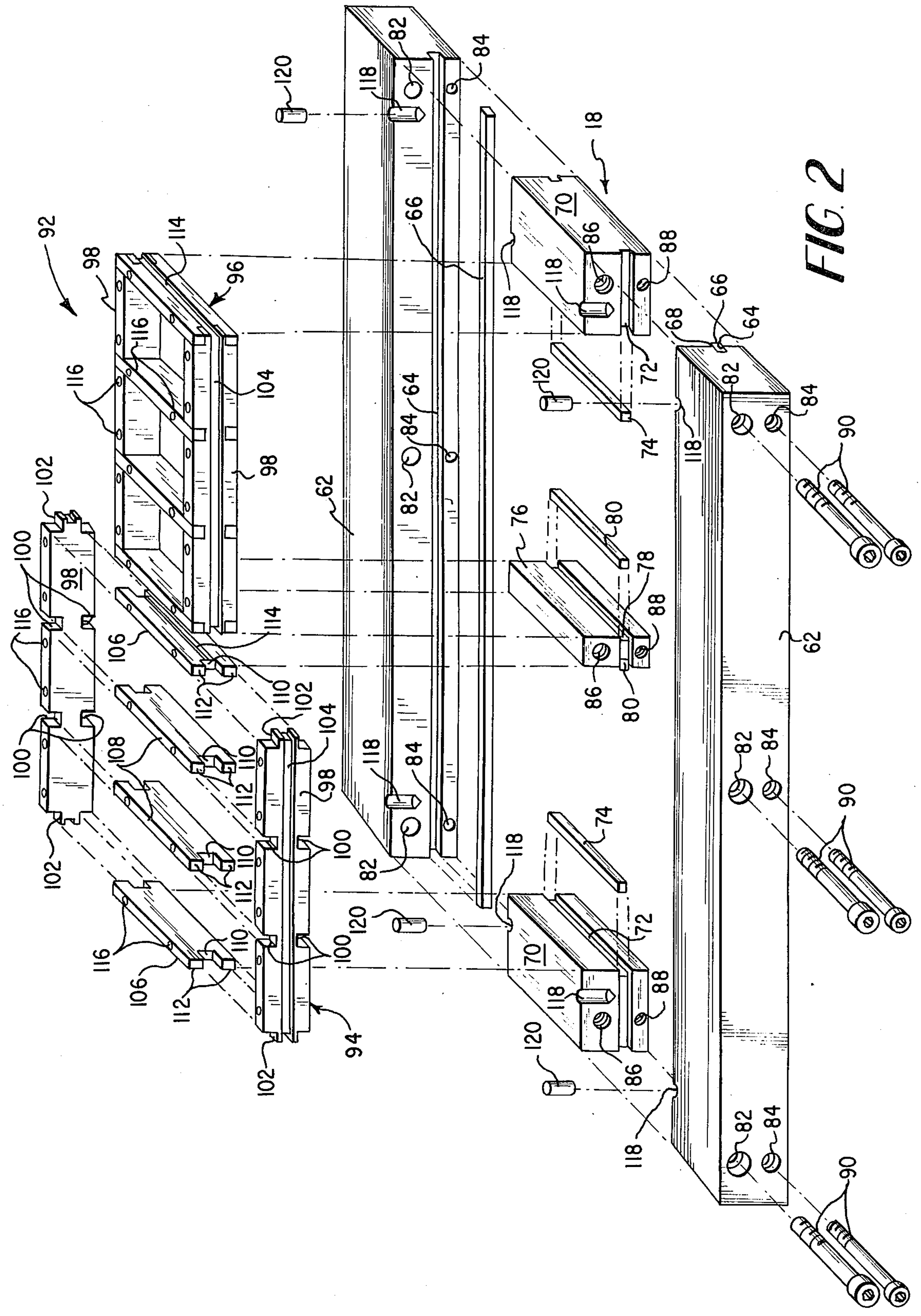
FIG. 2 is an exploded view of the case assembly frame and insert support member for a ceramic tile die constructed in accordance with the present invention.

With reference to FIG. 2, the frame 18 for the case assembly 12 includes two long side rails 62 of identical construction. These side rails may be formed from a tough alloy steel tempered to Rockwell 30/35C. Each side rail is provided with a keyway 64 which is cut to extend the entire length of the side rail, this keyway being dimensioned to receive a key strip 66. With this key strip in place, a portion of the key strip indicated at 68 extends outwardly beyond the surface of the supporting side rail.

The case frame side rails 62 are spaced apart with the keyways 64 in facing, spaced relationship by case frame end rails 70. These case frame end rails are of substantially identical construction and, like the case frame side rails 62 are formed of tough, tempered alloy steel. Each of the end rails is provided with a keyway 72 which extends along one longitudinal face of the end rail and also across the extent of both end faces thereof. The keyways 72 are positioned to correspond with the position of the keyways 64 in the side rails 62. The portion of the keyway 72 extending across the side face of the end rails 70 is adapted to receive a key 74 having a length which is equal to the length of the end rail 70 minus the amount that the keys 66 project beyond the side rails 62. These keys 74 also extend in like manner outwardly from the keyways 72 beyond the side face of the end rail 70.

In addition to the end rails 70, a center support rail 76 may be provided having a keyway 78 which extends around all four sides thereof. The center support rail is formed of the same material as the side rail 62 and end rail 70 and has a length which is equal to the length of the end rails. However, the center support rail need not be as wide as the end rails as it is intended only to join the central portion of the side rails to prevent bulging thereof under load pressure.

The keyways extending along the side faces of the center support rail 76 are adapted to receive keys 80 which are equal in length with the keys 74 and which project beyond the side faces of the center support rails.

To facilitate assembly of the frame 18, spaced bolt holes 82 and 84 are drilled through the case frame side rails 62 and are adapted to align with tapped holes 86 and 88 formed in the opposite ends of the end rails 70 and the center support rails 76. These holes are adapted to receive assembly bolts 90.

The case assembly frame 18 is formed to receive and mount an insert support assembly 92 so that the insert support assembly is rigidly secured against movement in the direction that the upper and lower punches 28 and 42, FIG. 1, move into the die cavity while being permitted limited movement relative to the case assembly frame in directions normal to the direction of punch movement. This insert support assembly may be formed of a plurality of sections when a center support rail such as the rail 76 is included in the frame 18 or, in the absence of the center support rail, the insert support assembly may be unitary. Basically, however, the overall construction of the sectional or unitary insert support assembly is the same.

The insert support assembly 92 of FIG. 2 includes two identical sections 94 and 96 with the latter being illustrated in assembled condition. These sections each include side supports 98 having a plurality of aligned upper and lower slots 100 spaced equally along the length thereof. A centrally located projecting tongue 102 is cut along the entire outer surface of each side support and across the end of the projecting tongues 102.

The side supports 98 are held in spaced relationship by end supports 106 and divider supports 108 of equal length. The ends of these divider and end supports are all provided with centrally located slots 110 which define upper and lower tongues 112. As will be noted with reference to the assembled section 96 the upper and lower tongues 112 of the end supports 106 are adapted to engage the projecting tongues 102 while the upper and lower tongues 112 of the divider supports 108 slide into and engage the slots 100. A keyway 114 is formed to extend across the outer surface of both end support members 106 and is positioned to mate with the keyways 104 in the side support members when the insert support assembly is formed.

To mount inserts on the insert support assembly 92 in a manner to be subsequently described, equally spaced mounting bolt receiving holes 116 are drilled vertically through the side support, end support and divider support members 98, 106 and 108. As will be noted from the assembled section 96, two equally spaced mounting bolt receiving holes 116 are provided upon each cavity defining wall of the insert support assembly.

To assemble the complete unit illustrated by FIG. 2, the components of the insert support sections 94 and 96 are mated to complete two assembled sections as illustrated at 96. Then the assembled insert support sections are mounted within the case assembly frame 18 with the keys 74 and 80 extending into the keyways 114 while the keys 66 extend into the keyways 104. Once this is accomplished, the assembly bolts are tightened so that the end keyways 72 and 78 receive the keys 66. This locks the insert support assembly 92 in place within the case assembly frame 18, and when all dimensions are checked and each cavity is squared, dowl holes 118 are drilled to receive locking dowls 120. The entire assembly may now be disassembled and later reassembled to the original dimensions.

It should be noted that the keys 66, 74 and 80 positively preclude movement of the insert support assembly 92 in the direction of movement of the punches 28 and 42 of FIG. 1. However, even though the parts of the insert support assembly are closely mated with the parts of the case assembly frame 18, the combined key and keyway supporting structure permits limited movement of the insert support assembly in directions normal to the direction of punch movement to absorb shocks. Thus the insert support assembly 92 is allowed to move slightly in response to shock and pressures which would cause damage if the support assembly was secured against all movement to the case assembly frame 18.

Figure 4:
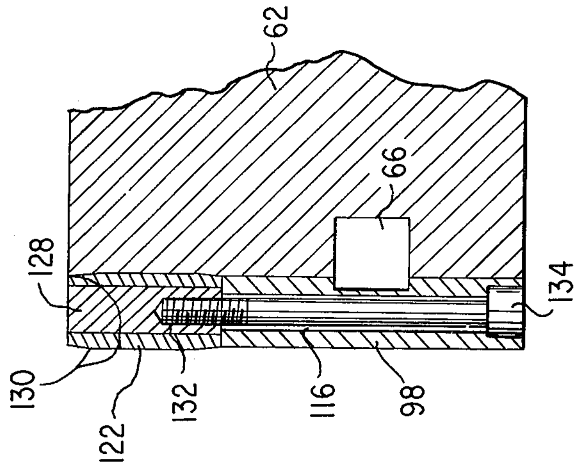
FIG. 4 is a cross sectional view of the die insert of FIG. 3 mounted upon the case frame and insert support member of FIG. 2.
Figure 3:
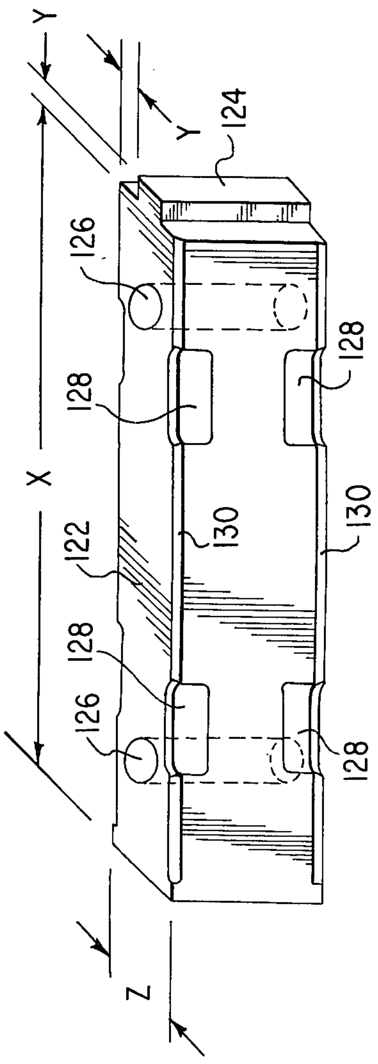
FIG. 3 is an isometric view of the die insert structure of the present invention.

Referring now to FIG. 3, a tungsten carbide insert 122 is formed in accordance with the present invention to provide an upper rim for the insert support assembly 92 of FIG. 2. The body of the tungsten carbide insert is formed of cemented tungsten carbide and a centrally located projecting tongue 124 extends from one end thereof. Plug holes 126 are formed to extend vertically through the insert 122 and the central axes of these plug holes are spaced apart for a distance substantially equal to the distance between the central axes of the mounting holes 116. Normally, the plug holes 126 are of greater diameter than the mounting holes 116, and these plug holes are adapted to receive soft steel plugs 127 (FIG. 4). These soft steel plugs are brazed into the plug hole and extend therethrough for the full height of the insert 122.

The sides of the insert 122 are cut away adjacent the upper and lower edges thereof to provide spaced pockets 128 which operate to form the spacer lugs on the pressed ceramic tile. These pockets correspond to pockets 20 of FIG. 1, and may be eliminated for tile having no spacer lugs. Also, the pockets may be formed to any configuration to provide a tile spacer lug of any desired shape. The vertical dimension of the pockets 128 is approximately two times the height of the spacer lug to be formed in the compressed tile.

The upper and lower edges extending lengthwise of the insert are tapered as indicated at 130 for a purpose to be subsequently described. It should be noted that the taper extends throughout the upper and lower edges of the pockets 128. However, the taper ends short of the square end of the insert for a distance which is equal to the distance that the tongue 124 projects from the opposite end of the insert.

To mount the insert 122 on the insert supporting assembly 92, a tapped hole 132 is formed in the steel plugs 127, (FIG. 4). Than a mounting bolt 134 is inserted from the bottom of the insert mounting assembly 132 up through each mounting hole 116 and is screwed into the overlying tapped hole 132 in the plug 122. By this method, each insert is secured to the underlying insert mounting assembly. It will be noted in FIG. 4 that the height of the combined insert and the insert mounting assembly is equal to the height of the case assembly frame 18.

A character of tungsten carbide is that as the hardness and wear resistance is increased, the brittleness increases and shock resistance is lowered. If the tungsten carbide inserts were to be held rigidly to the case assembly frame by mechanical or other means, they become very prone to chipping and fracture under the conditions prevalent in a ceramic tile die. Instead, in accordance with the present invention, the inserts are mounted upon the top edges of sections of the insert support assembly 92, and these sections are not rigidly mated but instead are capable of slight relative movement in response to pressure. This, coupled with the ability of the insert support assembly to move relative to the case assembly frame imparts to the novel case assembly of this invention the ability to effectively absorb shock and to minimize the tensile stress experienced by the walls of the die cavity. With tensile stress minimal, the forces on the walls of the die cavity are confined to high compressive stress, and the excellent compressive and abrasion resistive characteristics of tungsten carbine inserts may be effectively employed.

Figure 5:
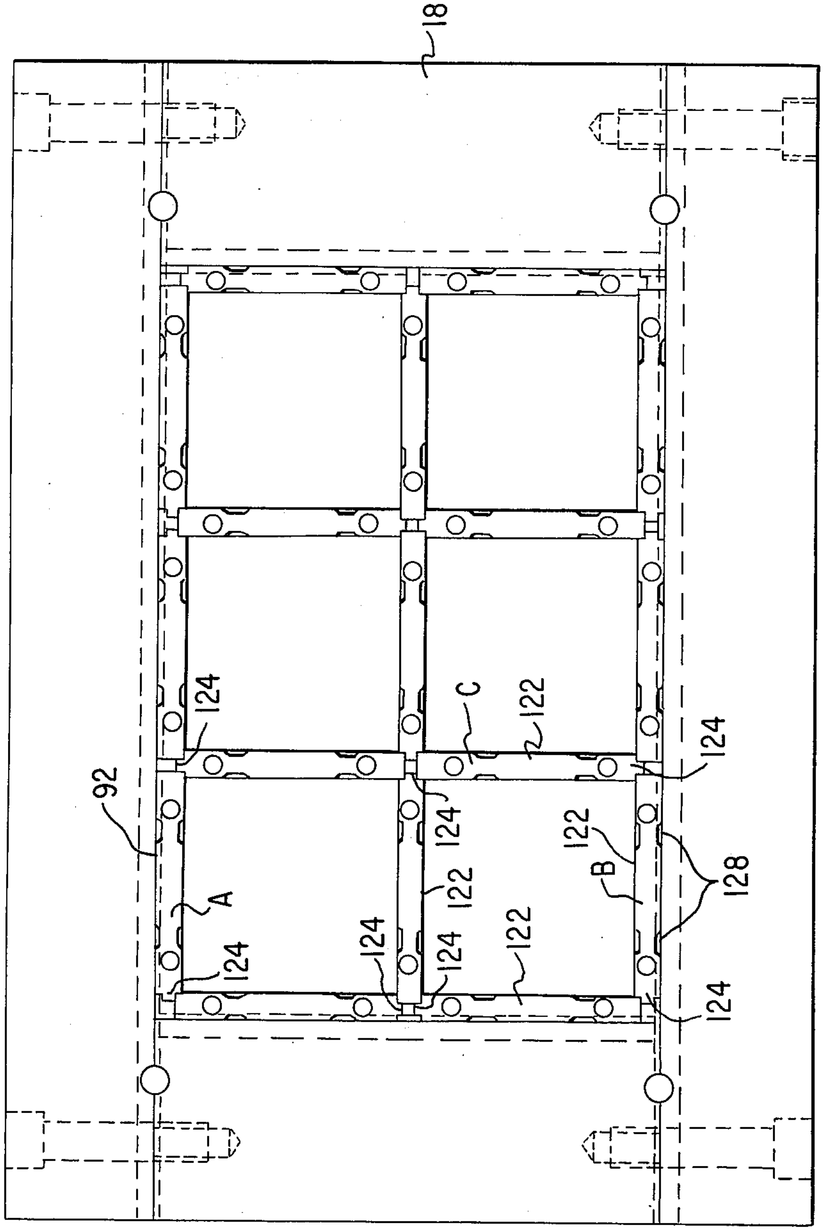
FIG. 5 is a plan view of the case assembly of the present invention.

FIG. 5 provides an illustration of a complete case assembly constructed in accordance with the present invention with the tungsten carbide inserts assembled within the case assembly frame 18 above the supporting insert support assembly 92. For purposes of better illustration, FIG. 5 shows a six impression, two row tandem die rather than the single row die formed by the assembly of FIG. 2. With the case assembly frame 18 defining a dimensionally correct opening as well as providing a mounting support for the insert support assembly 92. The individual inserts 122 are positioned in such a way that each is responsible for the location of its neighbor. Also, since the tongue 124 is formed at only one end of each insert and since the pockets 128 and the taper 130 are provided on both the upper and lower edges of each insert, the insert becomes adapted for universal use. The insert can be used on any die regardless of the number of cavities, and when one of the dividing inserts, such as the insert indicated at C in FIG. 5, becomes worn or damaged, it need only be turned upside down. By drilling and tapping a new hole 132 in the steel plug 127, this worn insert C can be reinstalled in the same position. When the outer rim inserts, such as those indicated at A and B in FIG. 5, become worn or damaged, they can be reused by simply shifting the location of insert A to that of insert B and replacing insert A with insert B. When both sides of these rim inserts become worn, they can be turned upside down and reattached to provide two new wear areas. Thus, four usable wear areas are provided with the rim inserts, such as inserts A and B, and two usable wear areas are provided with the dividing inserts, such as insert C. In the use of these inserts, the open area exposed at all the joints may be filled with a silicon liquid cement which is elastic and will not restrict any movements of the inserts when strained. This material is easily peeled off when changing an insert, but operates effectively to prevent any material build-up in the voids between inserts.

For purposes of description only, a tile die assembly for producing square tile has been disclosed. With an assembly of this type, all inserts are of equal length. The invention is equally effective with die assemblies for rectangular, oblong, hexagon or other shaped tiles. Obviously for these die assemblies, the inserts would not all be of equal length but would still be interchangeable with inserts of like length.

It will be noted from a brief review of FIGS. 2 and 4 that the sections forming the insert support assembly 92 are not positively connected together but are retained in assembled relationship by the case assembly support frame 18. Thus the only movement of the combined insert support and insert assembly within the case assembly frame 18 which is positively prevented is movement in the direction of movement of the upper and lower punches. Limited movement of the insert support assembly and the inserts in directions perpendicular to punch movement is possible under the extreme pressures employed in the pressing of ceramic tile. This limited movement is obviously extremely small, but is enough to prevent subjecting the inserts to high tensile stresses which would be present if the inserts and/or insert support assembly were positively connected to the case assembly frame 18.

Since the inserts 122 constitute the upper or leading edge of the cavity into which the male projection or punch of the upper die assembly 28 extends during the pressing operation, the taper 130 is necessary to protect the edges of the insert from chipping. This taper extends approximately 1/16th of an inch into the insert at a very slight angle to provide more clearance as the male punch enters the die cavity. Since the male punch enters more than 1/16th of an inch, the taper does not effect the die in any way and does allow for misalignment of the male punch without resulting in insert damage. The angle of the taper should conform with the maximum angle that the upper die assembly can become misaligned.

Whenever a hard material is struck or pressed against a carbide edge (meaning a corner or a point adjacent to an angle) this edge will tend to chip. If the blow or pressure is applied to a surface (as bringing two parallel surfaces together) no chipping will occur. In the instance of a right-angle corner, there is an extreme with a flat surface and the remaining extreme, a right-angle corner, is suppored by a 90° adjacent angle. If a 45° angle is formed on the corner, it would increase the chipping resistance by having a 135° supporting adjacent angle. By increasing the angle, more strength is added to the point where the angle meets the side wall. At a four degree angle off the side wall, there is created a supporting adjacent angle of 176°. Now, if the upper punch is within alignment to clear the upper portion of the angle but comes in contact with the insert somewhere on the angle, it will be forced to bear against the angle intersection point of the side wall. Since the edge is well supported, however, it will not chip. If the misalignment is sufficient that the punch strikes the top surface of the insert, chipping will occur.

Generally, misalignment of the upper die assembly under pressure will not be greater than four degrees, and therefore, with such an upper die assembly, the angle of the taper 130 should be 4°. With a four degree angle and the taper extending only one sixteenth of an inch within the die cavity, only 0.004 inches of additional die clearance is provided over normal male punch 28 clearance to die cavity for the male punch to enter the die cavity. However, this, coupled with the limited floating motion of the insert support assembly within the case frame 18 minimizes the tensile stress to which the inserts 122 are subjected, and permits the utilization of tungsten carbide inserts.

In all but the extreme conditions, the upper punch does enter within the taper or well within the die clearance. The greatest danger lies after the punch is well entered into the insert and the squeeze pressure commences, for now the upper punches may be caused to shift sideways when unequal fill is present, bearing against the insert. Since the 4° angle is well supported, no chipping occurs.

We claim:

1. A case assembly for defining at least one die cavity for receiving material to be compacted by at least one press member which moves into said die cavity during a pressure cycle and being operative to minimize the tensile stress to which the walls of said die cavity are subjected by said press member comprising a die cavity assembly formed to define the peripheral walls of said die cavity, a substantially rigid frame means surrounding said die cavity assembly, and mounting means to mount said die cavity assembly within said frame means to substantially preclude movement thereof relative to said frame means in the direction of movement of said press member into the die cavity while permitting limited pressure induced movement of said die cavity assembly relative to said frame means in directions normal to the direction of movement of said press member into the die cavity.

2. The case assembly of claim 1 wherein said die cavity assembly includes an insert support member mounted within said rigid frame means and a plurality of inserts mounted upon the peripheral edge surfaces at one end of said insert support member, said inserts defining cavity walls for the reception of said compacting press member.

3. The case assembly of claim 2 wherein said mounting means extends between said rigid frame means and said insert support member to mount said insert support member to said rigid frame means.

4. The case assembly of claim 3 wheerein said rigid frame means includes two sidewalls rigidly connected to two end walls to form an open ended enclosure, said insert support member including sidewalls and endwalls mounted within said open ended enclosure against the sidewalls and endwalls of said rigid frame means, said mounting means including a first keyway formed in the inner surfaces of the side and endwalls of said rigid frame means within said open ended enclosure to extend around the extent of said enclosure, a second keyway formed in the outer surfaces of the side and endwalls of said insert support member to extend in opposed relationship to said first keyway about the outer extent of said insert support member, and key members extending into said first and second keyways.

5. The case assembly of claim 4 wherein the sidewalls and endwalls of said insert support member are provided with cooperating projecting tongue and groove structures which interlock when said insert support member is assembled, said rigid frame means operating to maintain said insert support member in assembled condition within the open ended cavity thereof.

6. The case assembly of claim 5 wherein said inserts mounted upon said insert support member are coextensive with said insert member to define die cavity walls extending between the open ends of the open ended enclosure formed by said rigid frame means, said inserts forming the entry walls to said die cavity at one end of said open ended enclosure.

7. The case assembly of claim 6 wherein said inserts are formed by bars of tungsten carbide, the edges of said inserts defining the open end of said die cavity being tapered to increase the entry opening for reception of said press member.

8. The case assembly of claim 7 wherein said inserts are all of equal length.

9. The case assembly of claim 1 wherein said rigid frame means includes a plurality of elongated wall members rigidly connected to form at least one open ended enclosure, said die cavity assembly including an insert support member within said open ended enclosure, said insert support member including a plurality of wall members interconnected to define at least one cavity having at least one open end spaced inwardly from an open end of said rigid frame means, and a plurality of elongated inserts mounted on the surfaces of said insert support member wall members which define the terminal edges of said cavity.

10. The case assembly of claim 9 wherein said inserts extend from said insert support member to the open end of the enclosure formed by said rigid frame means.

11. The case assembly of claim 10 wherein said inserts extend along each terminal edge of the cavity defined by the wall members of said insert support member and are coextensive with said insert support member wall members to form substantially uninterrupted cavity walls, said inserts defining an open entry end for said die cavity.

12. The case assembly of claim 11 wherein said insert support member includes a plurality of outer wall members interconnected to define a central cavity and a plurality of divider wall members interconnected with said outer wall members to divide said central cavity into a plurality of cavities of substantially equal size.

13. The case assembly of claim 12 wherein each of said plurality of cavities is substantially square in cross section, the inserts mounted on said insert support member being of substantially equal length and of sufficient length to span one wall of one of said plurality of cavities.

14. The case assembly of claim 11 wherein at least the edges of said inserts bordering the open entry end of said die cavity are tapered to increase the area of said die cavity adjacent the open entry end thereof.

15. The case assembly of claim 14 wherein the tapered edges of said inserts are tapered to an angle substantially equal to the maximum angle to which said press member can become misaligned.

16. The case assembly of claim 14 wherein each such insert is formed by an elongated bar, the longitudinal edges of said bar being tapered.

17. An insert for attachment to an insert support in the case assembly of a ceramic tile die to form a wall section of the die cavity comprising an elongated unitary body having top and bottom walls, sidewalls joining said top and bottom walls and mounting means formed in the bottom wall of said body to facilitate attachment of said insert to the insert support.

18. The insert of claim 17 wherein at least one sidewall is tapered from a point adjacent to but below said topwall toward said topwall.

19. The insert of claim 17 wherein mounting means to facilitate attachment of said insert to the insert support are formed in the topwall and in the bottom wall of said body, each of said sidewalls being tapered from a point adjacent the juncture thereof with said top and bottom walls inwardly toward said top and bottom walls to form tapered longitudinal edges for said insert body.

20. The insert of claim 19 wherein said body is formed of tungsten carbide.

* * * * *